(12) United States Patent
Werner, Jr. et al.

(10) Patent No.: US 10,131,023 B2
(45) Date of Patent: Nov. 20, 2018

(54) ADJUSTABLE FIXTURE

(71) Applicant: Apple Inc., Cupertino, CA (US)

(72) Inventors: Charles H. Werner, Jr., San Jose, CA (US); Erik J. Gjøvik, Aliso Viejo, CA (US); Alexander H. Slocum, Bow, NH (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 14/223,568

(22) Filed: Mar. 24, 2014

(65) Prior Publication Data

US 2015/0089791 A1 Apr. 2, 2015

Related U.S. Application Data

(60) Provisional application No. 61/884,877, filed on Sep. 30, 2013.

(51) Int. Cl.
*B25B 1/20* (2006.01)
*B23Q 1/03* (2006.01)
(Continued)

(52) U.S. Cl.
CPC .......... *B23Q 1/035* (2013.01); *B23Q 3/065* (2013.01); *B23Q 3/088* (2013.01); *B23Q 2240/002* (2013.01); *Y10T 29/49998* (2015.01)

(58) Field of Classification Search
USPC ........................................................ 269/43
See application file for complete search history.

(56) References Cited

U.S. PATENT DOCUMENTS 2,684,537 A * 7/1954 Rosie ..................... G03B 35/20
206/558
2,754,708 A * 7/1956 Peterson ............... B25B 1/2421
269/224

(Continued)

FOREIGN PATENT DOCUMENTS

CA 2551235 A1 * 7/2005 ............. B23Q 1/035
CN 1683113 10/2005
(Continued)

OTHER PUBLICATIONS

Chinese Application No. 201410513090.4 First Office Action and Search Report dated Jun. 24, 2016.
(Continued)

*Primary Examiner* — Joseph J Hail
*Assistant Examiner* — Shantese McDonald
(74) *Attorney, Agent, or Firm* — Dickinson Wright RLLP

(57) ABSTRACT

The described embodiments relate to adjustable fixtures. A number of adjustable length cylindrical pins can be utilized to form a conformal support structure in accordance with a workpiece having any number of variations. At least three fixed length pins having heights lower than the adjustable length pins, can be interspersed with the adjustable length cylindrical pins to define an orientation at which the workpiece is held. Because the adjustable length pins have an uncompressed height greater than the fixed length pins, each of the adjustable length pins can be compressed in accordance with a bottom surface of the workpiece when the workpiece is pressed against the fixed length pin. In this way a conformal support structure can be formed that supports the workpiece during a machining operation.

20 Claims, 10 Drawing Sheets

(51) Int. Cl.
*B23Q 3/08* (2006.01)
*B23Q 3/06* (2006.01)

(56) References Cited

U.S. PATENT DOCUMENTS

| | | | |
|---|---|---|---|
| 3,168,311 A | 2/1965 | Sinden | |
| 4,088,312 A * | 5/1978 | Frosch | B23Q 1/035 269/21 |
| 4,118,453 A * | 10/1978 | Herrington | B29C 47/0026 264/209.3 |
| 5,120,033 A * | 6/1992 | Shoda | B23Q 16/001 269/21 |
| 5,984,293 A * | 11/1999 | Abrahamson | B23Q 1/035 269/236 |
| 6,264,187 B1 * | 7/2001 | Hertz | B25B 1/2421 269/21 |
| 6,345,816 B1 * | 2/2002 | Fitzpatrick | B25B 1/2421 269/20 |
| 6,497,403 B2 * | 12/2002 | Ries | H01L 21/6875 269/20 |
| 6,702,272 B2 * | 3/2004 | Monvavage | B23Q 1/035 269/266 |
| 6,726,195 B1 * | 4/2004 | Hertz | B23Q 1/035 269/266 |
| 6,898,837 B1 * | 5/2005 | Bennett | B41F 15/18 29/281.6 |
| 7,213,684 B2 * | 5/2007 | Bruns | B66F 9/18 187/237 |
| 7,997,891 B2 * | 8/2011 | Gallagher | B29C 33/0011 264/553 |
| 8,505,178 B2 * | 8/2013 | Farlow | H05K 13/0069 228/44.3 |
| 8,695,958 B2 * | 4/2014 | Marrinan | B23Q 1/035 269/315 |
| 9,138,841 B2 * | 9/2015 | Moncavage | B23Q 1/035 |
| 2002/0171025 A1 * | 11/2002 | Combs | H05K 13/0069 248/694 |
| 2003/0222388 A1 * | 12/2003 | Vander Wal, III | B23Q 3/183 269/296 |
| 2005/0269756 A1 * | 12/2005 | Stevenson | B23K 11/11 269/266 |
| 2005/0269758 A1 * | 12/2005 | Sears | B23K 11/11 269/266 |
| 2007/0069436 A1 * | 3/2007 | Zarske | B25B 11/005 269/1 |
| 2009/0057971 A1 * | 3/2009 | Bumgarner | B25B 11/005 269/21 |
| 2009/0261519 A1 * | 10/2009 | Piggott | B23Q 3/061 269/9 |
| 2009/0309283 A1 * | 12/2009 | Blick | B23Q 1/032 269/259 |
| 2013/0099812 A1 * | 4/2013 | Wang | G01R 31/2889 324/755.01 |

FOREIGN PATENT DOCUMENTS

| | | | | |
|---|---|---|---|---|
| CN | 101877939 | | 11/2010 | |
| CN | 102240913 | | 11/2011 | |
| CN | 103302155 | | 9/2013 | |
| DE | 19614176 A1 | * | 10/1997 | B25B 1/2421 |
| DE | 102007020901 A1 | * | 11/2008 | B23Q 1/035 |
| DE | 202012101508 U1 | * | 6/2012 | B23Q 1/035 |
| DE | 102014103641 A1 | * | 9/2015 | B23Q 7/047 |
| JP | WO 2008001654 A1 | * | 1/2008 | B23Q 1/035 |
| WO | WO 9713617 A1 | * | 4/1997 | B25B 1/2421 |
| WO | WO 2011064349 A1 | * | 6/2011 | B23Q 1/035 |

OTHER PUBLICATIONS

Chinese Patent Application No. 201410513090.4—Third Office Action dated Aug. 17, 2017.
Chinese Application No. 201410513090.4—Second Office Action dated Feb. 22, 2017.

* cited by examiner

ADJUSTABLE FIXTURE

CROSS-REFERENCE TO RELATED APPLICATIONS

This application claims the benefit of priority under 35 U.S.C § 119(e) to U.S. Provisional Application No. 61/884,877, filed on Sep. 30, 2013, the disclosure of which is incorporated herein by reference in its entirety.

FIELD

The described embodiments relate generally to fixtures. In particular an adjustable fixture is disclosed.

BACKGROUND

Fixturing a thin plate so that at least one side can be precision machined without any fixture or machining-induced deformations can be difficult. Current best practice is to double disk grind the plates so they are as flat as economically reasonable, and then machine the plates. However, the cost and final accuracy (flatness) achieved can be improved upon. For example, flat pin chucks are commonly used in the semiconductor industry to support silicon wafers while allowing them to be held down by vacuum so a top surface of the wafers can be processed. Flatness is of extreme concern and the pin tops are lapped flat to a plane. The pin chucks generally have a rectangular cross section that allows them to be arranged in an array. Unfortunately, the time and labor involved in lapping each of the pin chucks to a precise height can be both time consuming and expensive.

SUMMARY

This paper describes various embodiments that relate to apparatus and methods for applying a machining operation to a workpiece.

A method for fixturing a workpiece is disclosed. The method includes at least the following steps: placing a number of cylindrical pins on a flat surface, the plurality of cylindrical pins including at least three fixed length pins, and a number of adjustable length pins; pressing a workpiece against a top surface of each of the cylindrical pins until a bottom surface of the workpiece is in direct contact with each of the fixed length pins; applying lateral pressure to the plurality of cylindrical pins until the adjustable length pins are compressed into a hexagonal close packed array, wherein friction from adjacent pins locks each of the adjustable length pins at a height that corresponds to a bottom surface of the workpiece; and securing the workpiece against the plurality of cylindrical pins during a machining operation.

A fixture for supporting a workpiece during a machining operation is disclosed. The fixture includes at least the following: a housing including a number of walls defining a cavity; a lateral clamp disposed within the cavity; and a number of pins disposed within the cavity, at least three of the pins being fixed length pins and a remainder being adjustable length pins. The adjustable length pins are locked at a height in accordance with a bottom surface of the workpiece when the lateral clamp imparts a lateral force on the adjustable length pins.

A fixturing device for securing a workpiece in place during a machining operation is disclosed. The fixturing device includes at least the following: a housing including a number of sidewalls and a bottom wall cooperating to define a cavity, top edge portions of the sidewalls cooperating to define a top opening; an elastomeric sheet covering a portion of the top opening, the elastomeric sheet including a workpiece opening having a size and shape in accordance with the workpiece; a number of pins arranged along an interior surface of the bottom wall, the plurality of pins comprising at least three fixed length pins and a plurality of adjustable length pins; and a lateral clamping mechanism that applies a lateral force to the plurality of pins during the machining operation, the lateral force configured to lock the plurality of pins at a height that corresponds to a bottom surface of the workpiece.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which.

DETAILED DESCRIPTION

Figure 1A:
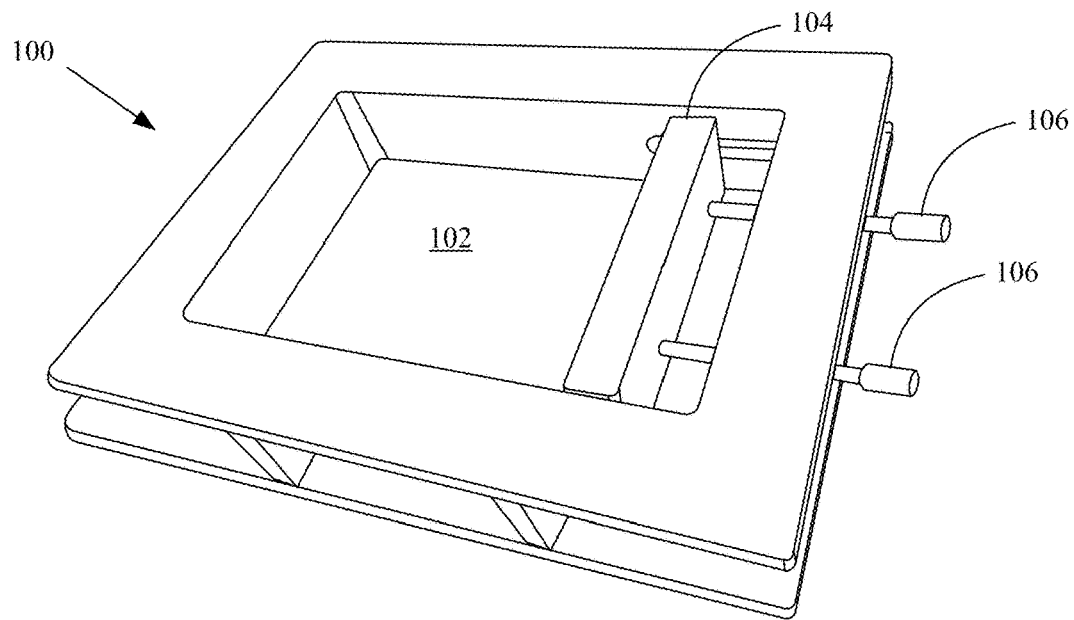
FIGS. 1A-1B show perspective views depicting a housing for a fixturing device.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

One advantage of using extruded metal in a manufacturing process is that a cross-sectional shape of the extruded metal can be customized. Unfortunately, during a post extrusion quenching process a shape of the extrusion often becomes distorted. To make matters worse, an amount of distortion can be substantially different for any given part. Conventional means for eliminating these types of distortions involve complex machinery in which both sides of a workpiece are concurrently machined. Previous attempts at using a fixture to correct this type of distortion have been unsuccessful since the fixture tends to deform the part as it is held during a machining operation designed to flatten a surface of the part. This can be especially problematic when dealing with workpieces having a particularly thin geometry. When the part is released from the fixture, the workpiece tends to reassume its previous shape such that the flattened surface is still distorted.

One solution to this problem is to create a fixture that has a surface that conforms to a geometry of a bottom surface of a workpiece. This way a surface against which the workpiece is secured doesn't deform the workpiece during a machining operation. By using such a support surface, a machining operation can be applied to flatten a surface of the workpiece, which then stays flat after the workpiece is released. This works because there is substantially no residual stress to relieve when the workpiece is released from the fixture. Customizing a surface for the workpiece can be time consuming and costly, especially when there is considerable sample variation between parts.

One economical way to produce a conformable surface is with a fixture that utilizes a number of adjustable length pins. The fixture can includes a number of pins that cooperate to create an adjustable support surface for a workpiece. At least three of the pins are fixed length pins that define a plane upon which the workpiece can rest. The remaining pins are adjustable length pins that are initially taller than the fixed length pins, but are compressed once the workpiece comes into contact with the fixed length pins. In one embodiment, the adjustable pins can be spring-loaded pins that are easily compressible and are unlikely to apply force sufficient to damage the workpiece. It should be noted that any compressible pin member can be utilized that provides a nominal amount of force when encountered by the workpiece. In one embodiment, in which a bottom surface of the workpiece is already substantially flat the compressed adjustable length pins are substantially the same height as the fixed length pins. However, in a workpiece that has a bottom surface with a varying geometry or a substantial amount of distortion the adjustable pin height can be substantially different to accommodate the variations in the workpiece.

Once the pins have conformed to the workpiece a lateral force can be applied to the pins. The lateral force causes the pins to be compressed against each other in a hexagonal close packed array. This lateral force effectively locks the adjustable pins to a length that corresponds to the bottom surface of the workpiece. Once the adjustable pins are all locked in place, vacuum suction can be applied to fix the workpiece to the established conformal surface of the fixture during a machining operation. In this way, a final geometry of the workpiece can be substantially the same once the workpiece is released from the fixture. It should be noted that while the discussed embodiments are well suited for machining extruded metal as discussed above, the discussed fixtures can be adapted to support and secure a workpiece having various sizes and shapes.

These and other embodiments are discussed below with reference to FIGS. 1A-8; however, those skilled in the art will readily appreciate that the detailed description given herein with respect to these figures is for explanatory purposes only and should not be construed as limiting.

Figure 1B:
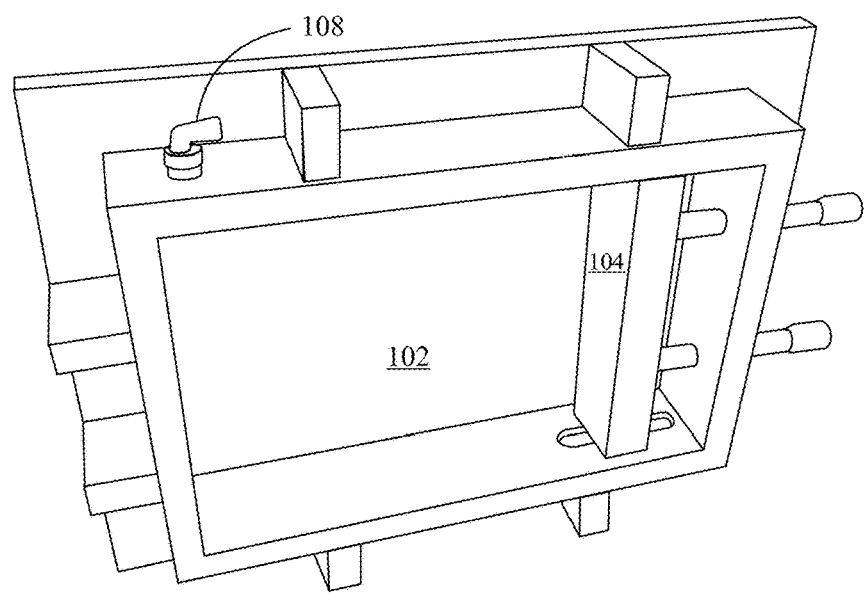

FIGS. 1A-1B show perspective views depicting a housing 100 of a fixturing device suitable for use with embodiments described herein. FIG. 1A shows housing a top perspective view of housing 100. Housing 100 includes a cavity 102 within which a number of pins can be arranged. Housing 100 also includes lateral clamp 104 which can be embodied as a flat plate configured to impart a lateral force upon pins disposed within cavity 102. In this particular depiction housing 100 also includes screws 106. Screws 106 can be configured to advance lateral clamp 104 until a desired amount of lateral force is applied to pins disposed within cavity 102. While screws 106 are one way to apply the lateral force many other embodiments are also possible, for example, the lateral clamp can be embodied by a constriction band, a hydraulic press, a spring or springs, or a wedge. Generally, the lateral clamp should be configured to apply about 100 in-lbs of force on the pins. FIG. 1B shows a bottom view of housing 100 with a bottom plate member removed to more clearly show cavity 102. FIG. 1B also shows side port 108 that can be configured to adjust a pressure within cavity 102 during a machining operation. A suction system can be coupled to side port 108 to evacuate air from cavity 102. Housing 100 can include a number of ports for regulating a pressure within cavity 102. In embodiments where cooling fluid is introduced into cavity 102 various ports can be used to circulate cooling fluid into and out of cavity 102.

Figure 2:
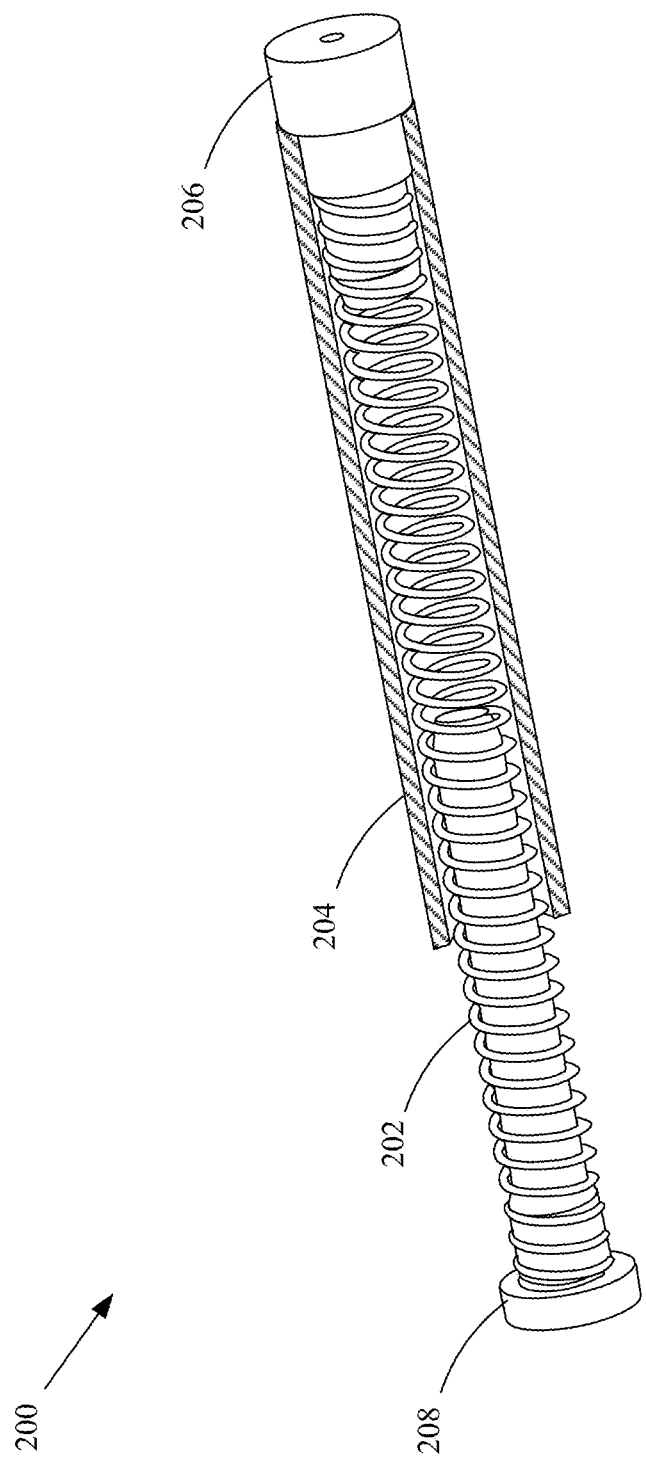
FIG. 2 shows a perspective view of an adjustable pin suitable for use with the housing depicted in FIGS. 1A-1B.

FIG. 2 shows a perspective view of adjustable pin 200. In this depiction adjustable pin 200 is an adjustable spring pin that includes a number of elements. Spring 202 is housed in pin body 204. Only half of pin body 204 is depicted so that internal elements of adjustable pin 200 can be depicted. Pin body 204 can be a thin walled stainless steel pin body 204. The thin walls of pin body 204 can allow for deformation of pin body 204, thereby increasing a packing density and frictional force between adjacently packed pins. In one particular embodiment, spring 202 can be configured such that force applied by the spring to the workpiece limits deflection of the workpiece to about 3 microns. Adjustable pin 200 also includes two end caps 206 and 208. End cap 206 can be made of a material that is not substantially harder than the workpiece it is configured to support. In one particular embodiment, end caps 206 and 208 can be formed from anodized aluminum, and a total longitudinal length of adjustable pin 200 can be about 4.5 inches in a fully compressed state. End caps 206 and 208 can also be configured to axially stabilize spring 202. It should be noted that while end caps 206 and 208 are depicted having cylindrical geometries alternative shapes are possible, such as for example a rounded top shape. In one particular embodiment, end cap 206 can have a bullet shaped or convex geometry. In another embodiment, both end caps 206 and 208 along with pin body 204 can have outer surfaces defining non-circular geometries, such as for example a hexagonal cross-section. Adjustable pins having hexagonal geometries can still allow the adjustable pins to assume a hexagonal close packed array when compressed together. Other geometries are also possible and considered within the scope of this disclosure.

Figure 3:
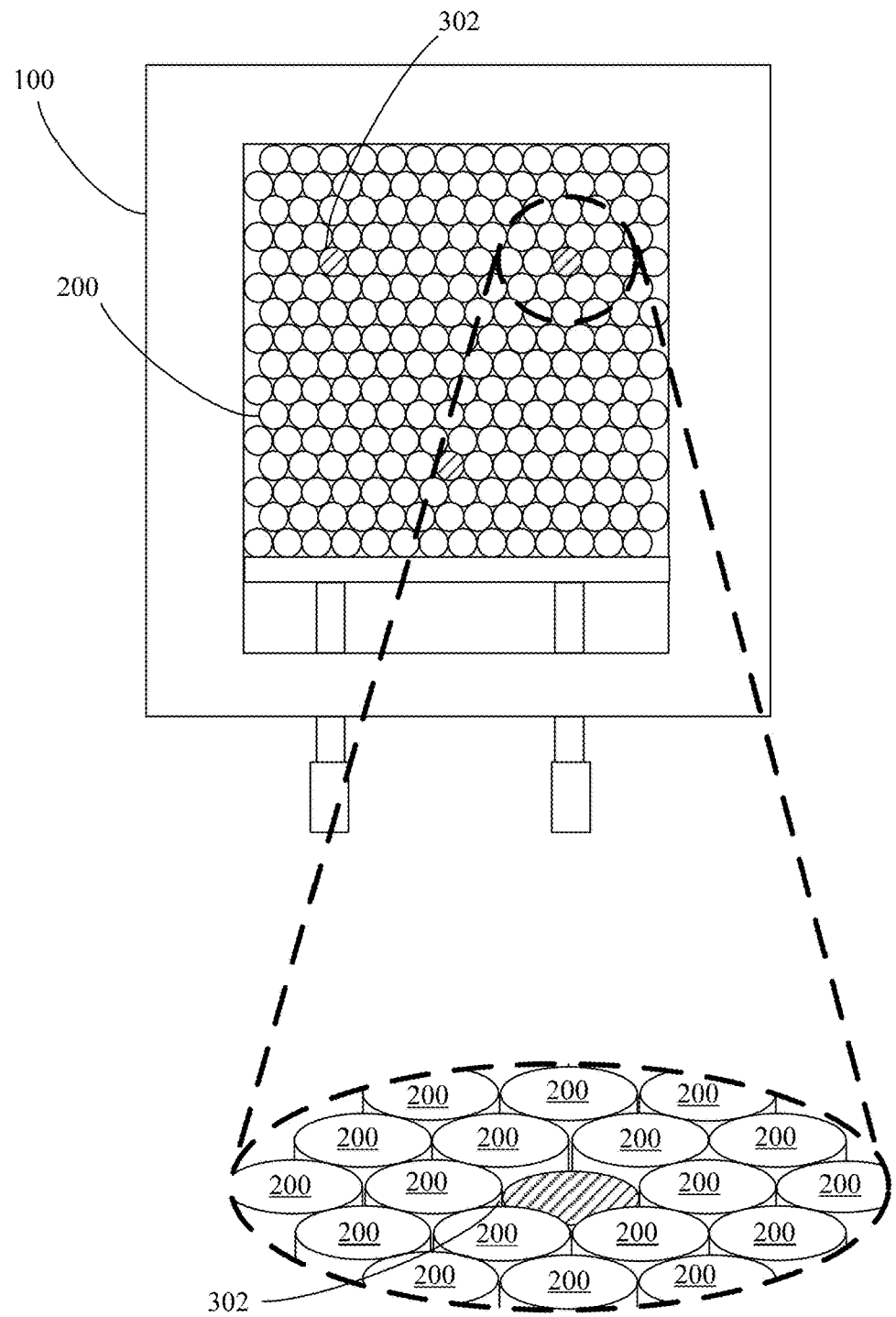
FIG. 3 shows a top view of a housing filled with a number of pins.

FIG. 3 shows a top view of housing 100 filled with a number of pins. The pins can include adjustable length pins 200 and fixed length pins 302. Fixed length pins 302 can be machined to be a predetermined height that is shorter than an uncompressed height of adjustable length pins 200. In one embodiment, establishing a height of the fixed length pins 302 can be accomplished after all the pins are loaded into housing 100. A metal plate can be pressed down upon adjustable length pins 200 with holes open for fixed length pins 302. In this way, adjustable length pins 200 can be compressed below a height at which fixed length pins 302 should be machined. Once each of fixed length pins 302 is machined to have a predetermined height the metal plate can be removed. In some embodiments the metal plate can be operative to collect any metal chips from adjusting a height of the fixed length pins. In this way, fixed length pins 302 can be precision machined to be a particular height above a bottom inside surface of housing 100. Subsequent to setting a height of the fixed length pins, each of adjustable length pins 200 can engage a bottom surface of a workpiece as the workpiece comes into contact with each of fixed length pins 302. The depicted close up view of FIG. 3 shows how fixed length pin 302 is shorter than adjustable length pins 200 when adjustable length pins 200 are in an uncompressed state.

Figure 4A:
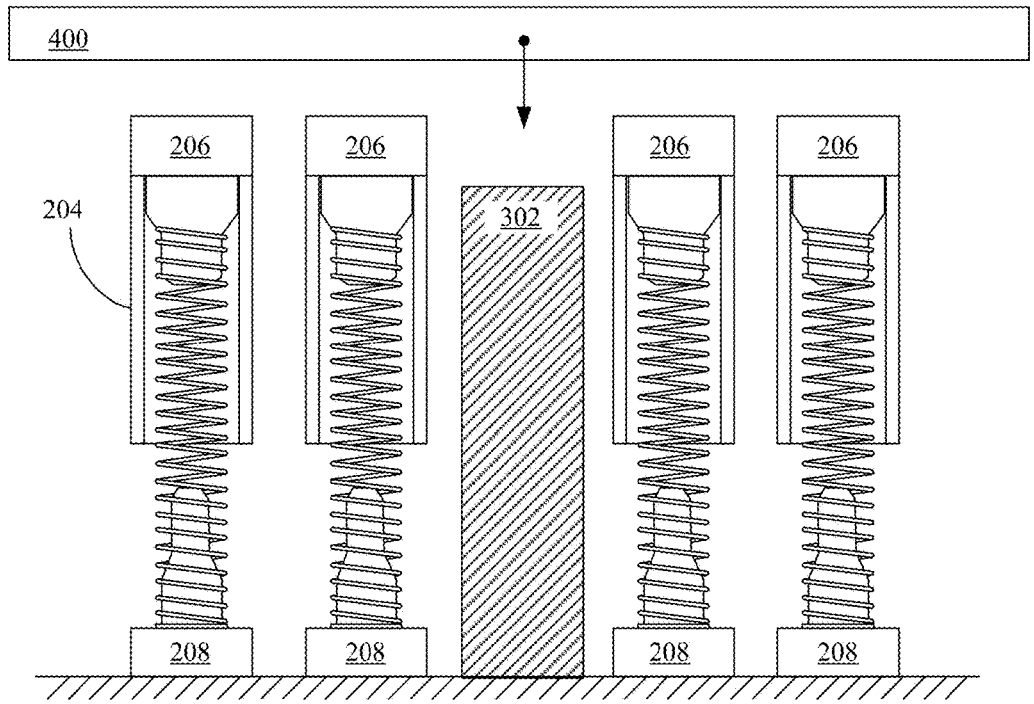
FIGS. 4A-4D show cross-sectional side views of fixed length and adjustable length pins prior to and during support of a workpiece.
Figure 4B:
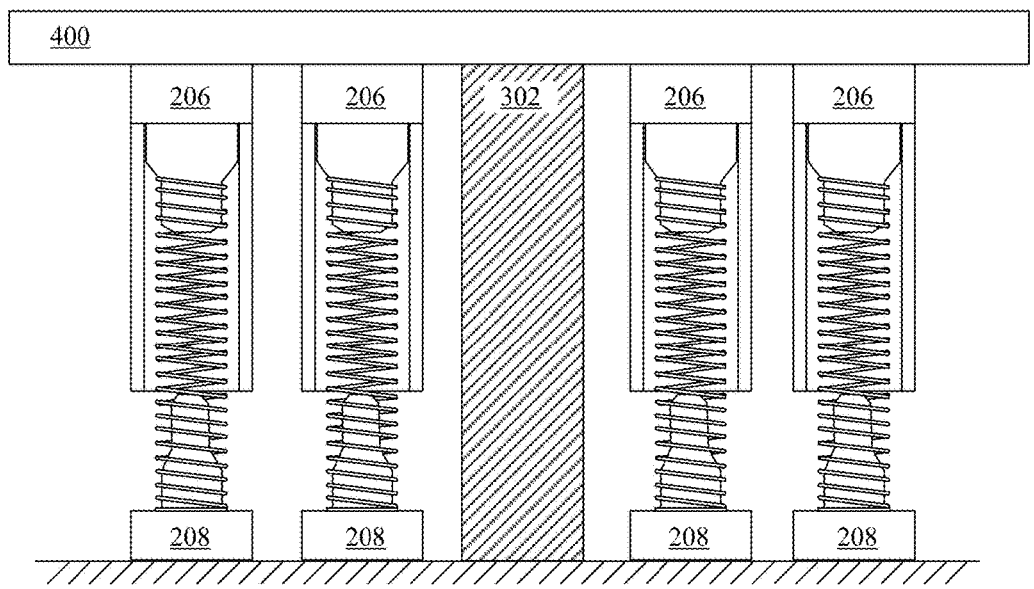

FIGS. 4A-4D show cross-sectional views of fixed length and adjustable length pins prior to and during support of a workpiece. FIG. 4A shows adjustable length pins 200 disposed about fixed length pin 302. As illustrated adjustable length pins 200 have a substantially greater height than fixed length pin 302. In FIG. 4A workpiece 400 is disposed just above the pins. In one embodiment a three-point vacuum gripper can be utilized to lower workpiece 400 onto fixed length pin 302. By utilizing a three-point vacuum gripper, warping of workpiece 400 can be substantially prevented while it is being suspended above the pins. This can help to prevent some of adjustable length pins 200 from being improperly compressed when they come into contact with workpiece 400. In FIG. 4B, workpiece 400 is shown in full contact with fixed length pin 302. In some embodiments, the vacuum gripper can vibrate workpiece 400 once it is in contact with the pins to prevent friction between adjacent pins or bulkheads from preventing one of the pins from properly contacting workpiece 400. In this particular depiction, as a result of a bottom surface of workpiece 400 being substantially flat, each of adjustable length pins 200 are compressed to substantially the same height as fixed length pin 302.

Figure 4C:
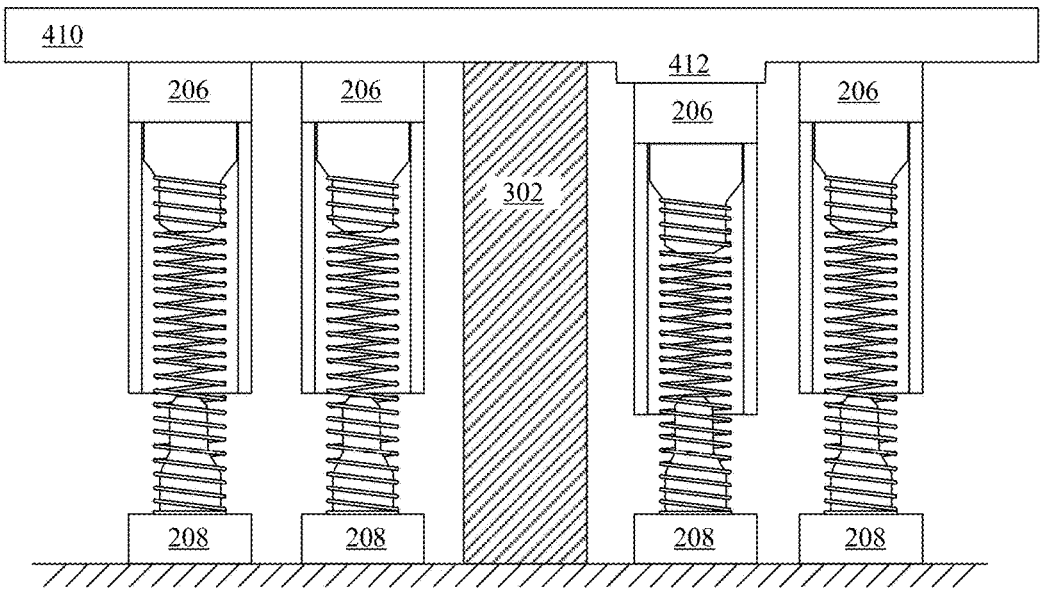
Figure 4D:
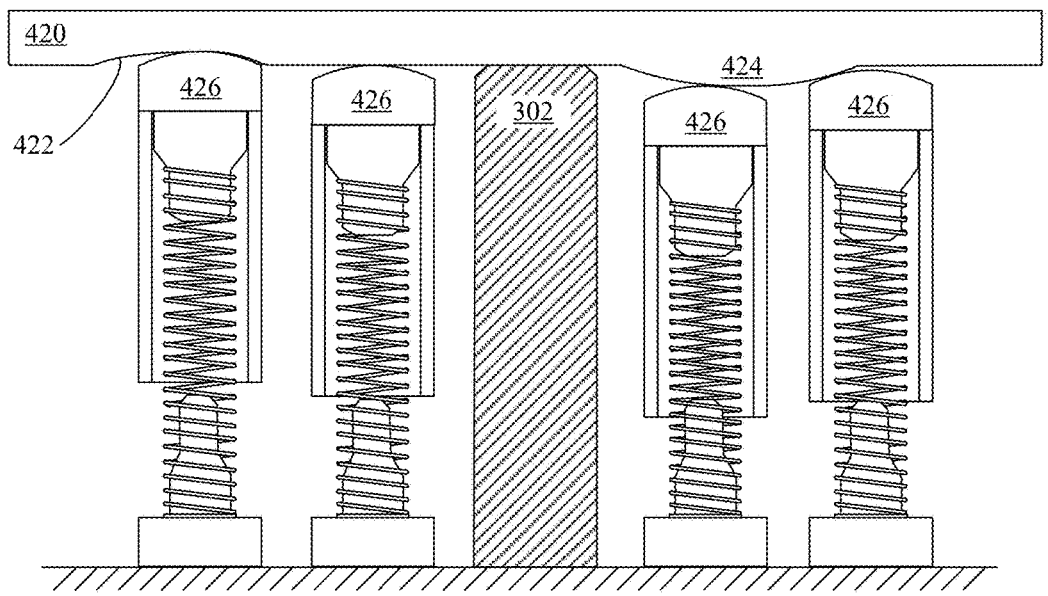

FIG. 4C shows an alternative embodiment in which workpiece 410 includes a protruding feature 412 along a bottom surface of workpiece 410. In some embodiments, protruding feature 412 can be part of a design of workpiece 420. One of adjustable length pins 200 is shown compressing further than others of the adjacent adjustable pins 200, thereby preventing protrusion 412 from receiving an undue amount of pressure from any of the various pins. Furthermore, while only a single pin is shown deforming, depending on a size and shape of protrusion 412, a number of pins can have various amounts of compression to accommodate protrusion 412. FIG. 4D another alternative embodiment in which a bottom surface of a workpiece 420 is substantially varied. Workpiece 420 includes a depression 422 that can cause one of the adjustable length pins to have a height greater than fixed length pin 302. Workpiece 420 can also include a protrusion 424 that causes some of the adjustable length pins to have variable amounts of compression as depicted. In other embodiments, sample variation can cause differences in compression of the various pins. Another difference shown in FIG. 4D is rounded end caps 426. The rounded end caps allow end caps 426 to more smoothly interact with a varied bottom surface of workpiece 420. In this way, sharp edges are prevented from impacting a bottom surface of workpiece 420, thereby preventing undue gouges or stresses upon workpiece 420. End caps 426 can also include damping elements in the end caps to allow for a configuration in which adjustable length pins 200 are not locked. In such a configuration, the damping elements can prevent vibrations caused by a machining operation from unduly vibrating spring elements within unlocked adjustable length pins 200. In another embodiment, a contact surface of end caps 426 can include, for example, a rubber or neoprene surface to help prevent scratching or damage between the pins and the workpiece.

Figure 5A:
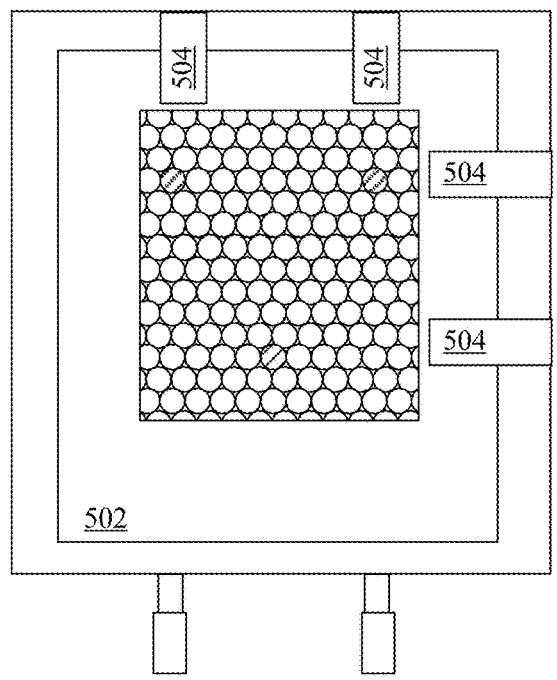
FIGS. 5A-5B show top views of a fixture having a skirt configured to seal a cavity portion of a housing of the fixture in cooperation with a workpiece.
Figure 5B:
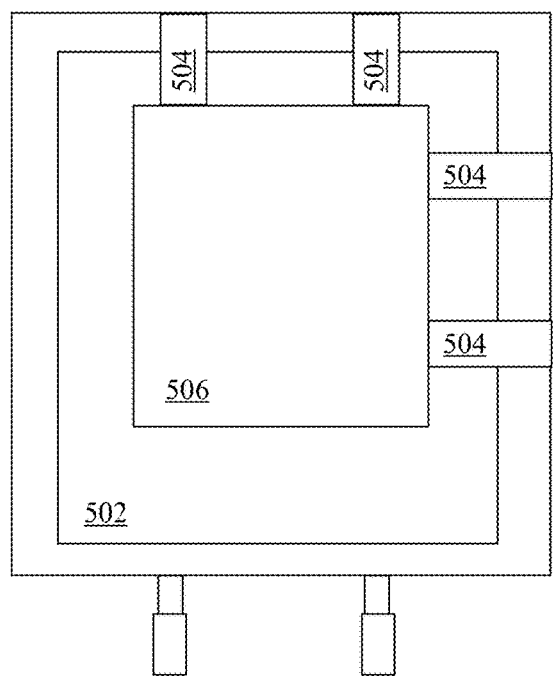

FIG. 5A shows a top view of housing 100 filled with pins. Skirt 502 can be placed over a portion of the pins. Skirt 502 can include an opening over a portion of the pins, the opening having a size and shape in accordance with workpiece 506. The workpiece in cooperation with skirt 502 can be configured to seal cavity 102, so that the workpiece can be fixed in place by vacuum suction. Peripheral portions of the workpiece can overlap a portion of skirt 502 to seal cavity 102. In some embodiments, skirt 502 can be formed from a rubber sheet and a metal frame. In one particular embodiment, the rubber sheet can be about 1/32 of an inch thick. The metal frame can be configured to stabilize the rubber sheet in place when suction is applied within cavity 102. In one particular embodiment, about 0.25 atm of suction can be applied. In yet another embodiment, skirt 502 can be a metal frame having an opening sized in accordance with workpiece 506. Skirt 502 can include a lip seal configured to engage lateral sides of the workpiece to create the seal. FIG. 5B shows how workpiece 506 can overlay the opening in skirt 502. Furthermore, FIG. 5B shows how alignment datums 504 can be utilized to position workpiece 506 with respect to a machining tool. In one embodiment, alignment datums 504 can be bolted to housing 100, thereby providing a secure stop against which a machining tool can exert machining force. In some embodiments, alignment datums 504 can reduce an amount of vacuum suction required to fix workpiece 506 during a given machining operation, when force from the machining operations are directed towards datums 504.

Figure 6A:
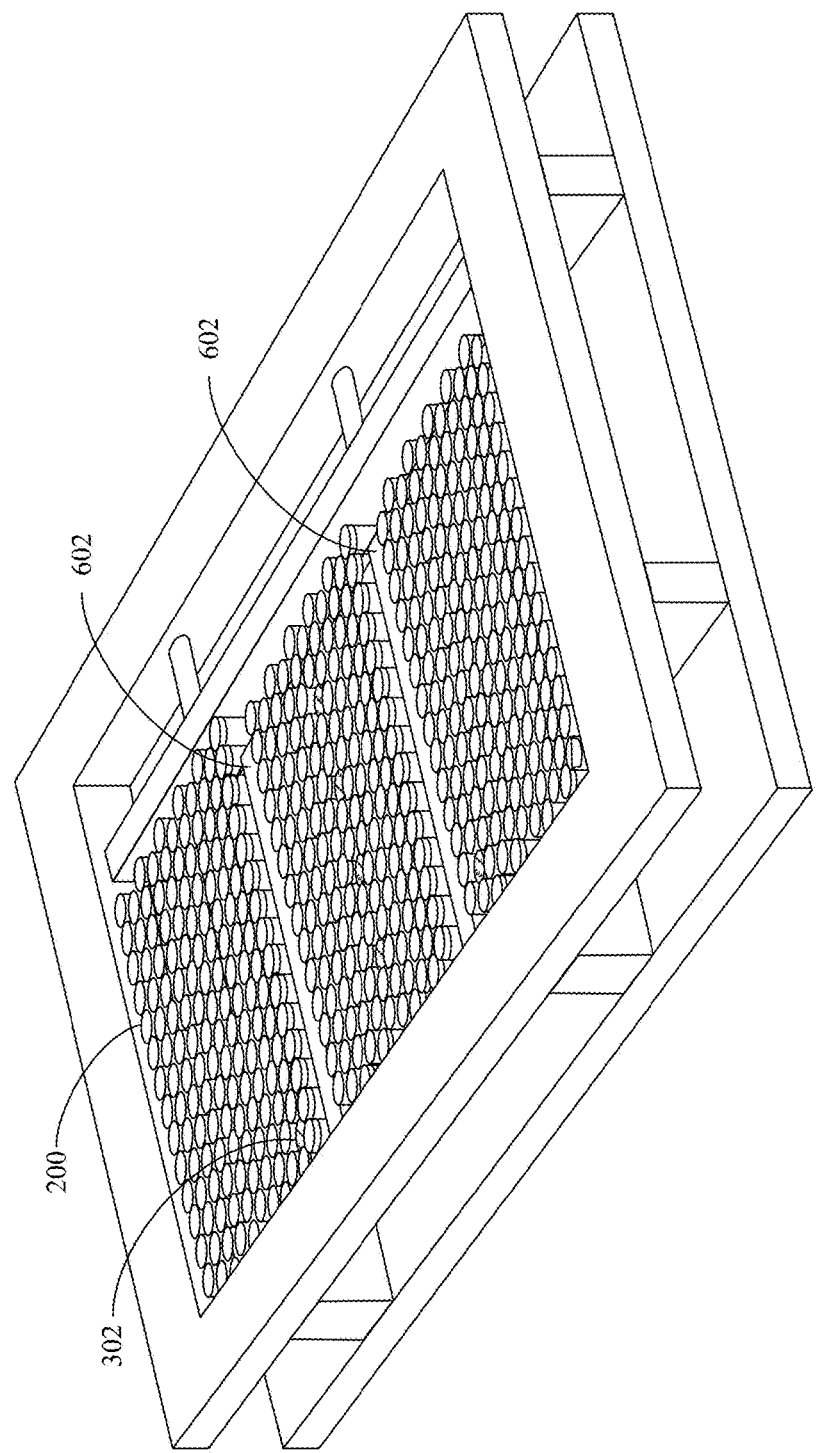
FIG. 6A shows a perspective view of a fixture including a number of bulkheads to improve a rigidity of adjustable length pins disposed within the fixture.
Figure 6B:
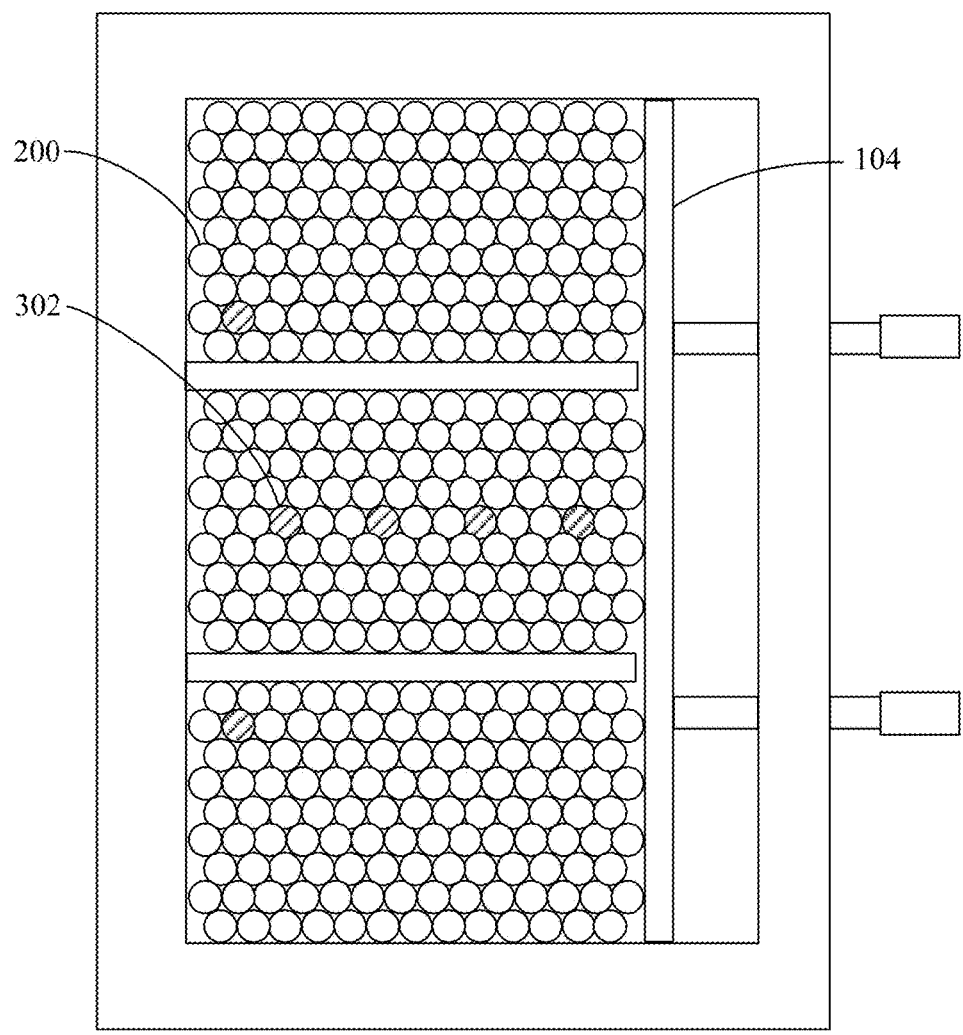
FIG. 6B shows a top view of the fixture depicted in FIG. 6A.

FIG. 6A shows a perspective view of housing 100 filled with pins and bulkheads. Bulkheads 602 can be operative to increase a rigidity of adjustable length pins 200. As an area of compressed pins grows a rigidity of the adjustable pins decreases. By placing rigid bulkheads 602 at intervals throughout cavity 102, a rigidity of adjustable length pins 200 can be increased. In some embodiments bulkheads 602 can be secured in place only by adjacent pins, while in other embodiments bulkheads 602 can be secured to a bottom inside surface of housing 100. Regardless, rigid bulkheads 602 can have a height lower than fixed length pins 302 so that rigid bulkheads 602 do not come in contact with a bottom surface of a workpiece. Bulkheads 602 can be narrow with respect to the pins so that there is no substantial loss in support for the workpiece. FIG. 6B shows a top view of housing 100. In this view, the hexagonal close packed array of pins can be clearly seen. This geometry is enabled by the cylindrical geometry of each of the pins. Furthermore, a length of bulkheads 602 can be short enough so that bulkheads 602 do not directly contact lateral clamp 104, when lateral clamp 104 is engaged with the pins as depicted in FIG. 6B. Although a total of five fixed length pins 302 are depicted it should be understood that the depicted embodiment is operable with as few as three fixed length pins 302.

Figure 7:
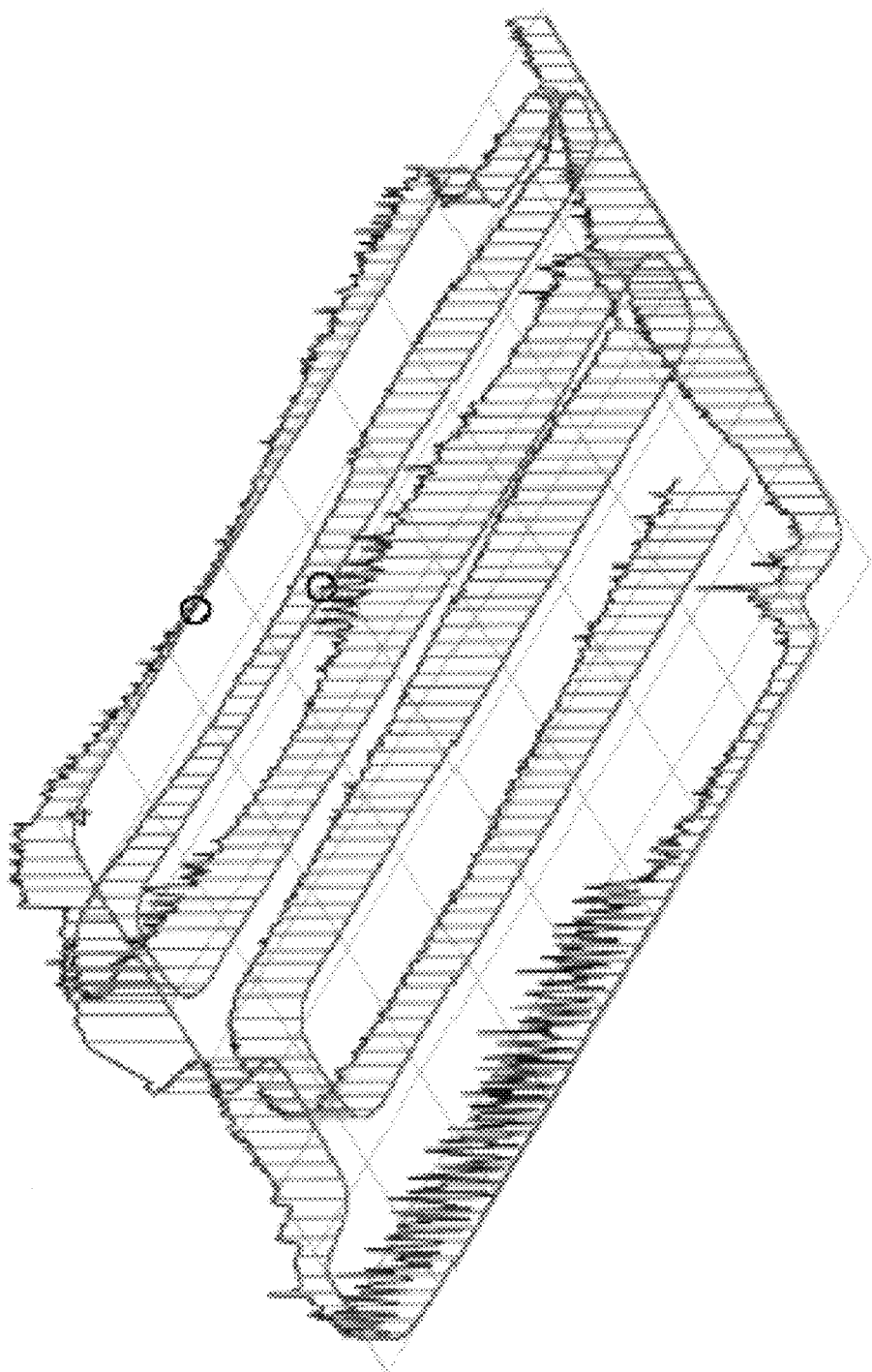
FIG. 7 shows a graph depicting a flatness of a top surface of a workpiece processed in accordance with the described embodiments.

FIG. 7 is a graph depicting results of a machining operation to flatten a top surface of a workpiece. During the machining operation about 0.012 inches of material was removed. The graph shows that a maximum difference between a central portion of the workpiece and a peripheral portion of the workpiece (high and low spots indicated with circles in FIG. 7) is about 15 microns using the described embodiments.

Figure 8:
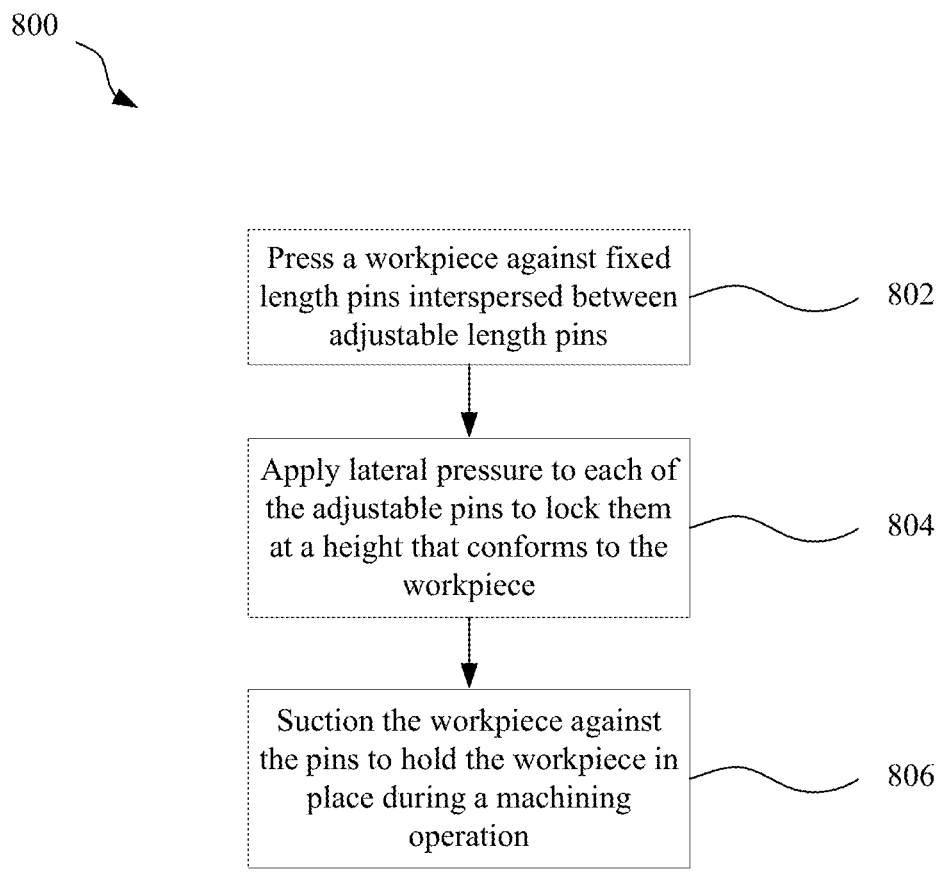
FIG. 8 shows a block diagram illustrating a method for fixturing a workpiece during a machining operation.

FIG. 8 shows a block diagram illustrating a method for fixturing a workpiece during a machining operation. In a first step 802, a bottom surface of a workpiece is pressed against a number of pins until the workpiece engages at least three fixed length pins. While pressing the workpiece against the fixed length pins, a number of adjustable length pins are compressed and conform to a shape of the bottom surface of the workpiece. The three fixed length pins each have a predetermined height that establishes the workpiece in a desired orientation. After the workpiece is seated against the fixed length pins, at step 804 a lateral force is applied against the pins to lock the adjustable length pins at heights that correspond to the bottom surface of the workpiece. The lateral force can be applied by a housing defining a cavity that surrounds and supports the pins. Subsequent to locking the pins in place, at step 806, the workpiece is suctioned against the pins to hold it in place during a machining operation. It should be noted that in some embodiments the cavity of the housing can be filled with cooling fluid for removing heat from the workpiece during the machining operation.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for supporting a workpiece within a fixture device during a machining operation, comprising:
    placing an array of pins on a surface of a housing, the surface cooperating with other surfaces of the housing to define a cavity, wherein the array of pins include at least one fixed length pin having a fixed geometry which is positioned between a plurality of adjustable length pins, and the at least one fixed length pin is capable of supporting a bottom surface of the workpiece;
    aligning the workpiece within the cavity of the housing by abutting a plurality of alignment datums that are carried by walls of the fixture device against a surface of the workpiece;
    pressing the bottom surface of the workpiece against the at least one fixed length pin such as to cause the plurality of adjustable length pins to conform to the bottom surface of the workpiece;
    applying lateral pressure to the array of pins until the plurality of adjustable length pins are compressed such as to cause the plurality of adjustable length pins to lock at a height that corresponds to the bottom surface of the workpiece; and securing the workpiece against the array of pins during the machining operation.

2. The method as recited in claim 1, further comprising: machining the workpiece during the machining operation by utilizing the plurality of alignment datums.

3. The method as recited in claim 1, further comprising: circulating cooling fluid through the housing in order to remove heat from the bottom surface of the workpiece during the machining operation.

4. The method as recited in claim 1, further comprising: covering a portion of a top opening of the housing with a skirt having an opening sized in accordance with the bottom surface of the workpiece.

5. The method as recited in claim 4, wherein securing the workpiece against the array of pins during the machining operation comprises suctioning air from the cavity of the housing.

6. The method as recited in claim 1, wherein applying the lateral pressure to the array of pins causes the array of pins to compress together in a generally lateral manner.

7. The method as recited in claim 1, wherein each adjustable length pin of the plurality of adjustable length pins has a rounded top surface.

8. The method as recited in claim 1, wherein pressing the bottom surface of the workpiece against the at least one fixed length pin comprises suctioning air from the cavity of the housing.

9. A fixture for supporting a workpiece during a machining operation, the fixture comprising:
    a housing including walls defining a cavity;
    alignment datums carried by the walls of the housing, wherein the alignment datums are capable of abutting with a surface of the workpiece so that the workpiece is capable of being aligned with the fixture during the machining operation;
    an array of pins that are disposed within the cavity and are capable of being aligned with the workpiece, the array of pins comprising at least one fixed length pin that is positioned between a plurality of adjustable length pins, wherein contact between the at least one fixed length pin and a bottom surface of the workpiece causes the plurality of adjustable length pins to compress to conform to the bottom surface of the workpiece; and
    a lateral clamp disposed within the cavity, wherein the lateral clamp imparts a lateral force upon the array of pins that causes the array of pins to compress such that the plurality of adjustable length pins are fixed at a height that corresponds to the bottom surface of the workpiece.

10. The fixture as recited in claim 9, further comprising: a skirt capable of being placed over a top opening of the housing to cover a portion of the array of pins.

11. The fixture as recited in claim 10, wherein the alignment datums are capable of providing a secure stop against which a machining tool exerts machining force against the workpiece during the machining operation.

12. The fixture as recited in claim 9, wherein the alignment datums are coupled to a top surface of the walls of the housing.

13. The fixture as recited in claim 9, wherein the at least one fixed length pin is fixedly positioned along an inside surface of a bottom wall of the housing.

14. The fixture as recited in claim 9, further comprising: a vacuum apparatus configured to draw air out of the cavity so as to secure the bottom surface of the workpiece against the array of pins.

15. The fixture as recited in claim 9, further comprising: a cooling fluid circulation system configured to circulate cooling fluid through the cavity of the housing during the machining operation.

16. The fixture as recited in claim 9, wherein each pin of the array of pins is characterized as having substantially similar geometry that facilitates generally lateral compression of the array of pins into a close packed array when the lateral clamp imparts the lateral force upon the array of pins.

17. A fixturing device for securing a workpiece in place during a machining operation, the fixturing device comprising:
a housing comprising a plurality of sidewalls and a bottom wall cooperating to define a cavity, wherein top edge portions of the plurality of sidewalls cooperate to define a top opening;
alignment datums carried along a top surface of the sidewalls of the housing, wherein the alignment datums are capable of abutting with a surface of aligning the workpiece so that the workpiece is capable of being aligned relative to the fixturing device during the machining operation;
an elastomeric sheet covering a portion of the top opening, the elastomeric sheet comprising a workpiece opening having a size and shape in accordance with the workpiece;
a plurality of pins arranged along an interior surface of the bottom wall, the plurality of pins comprising at least one fixed length pin and a plurality of adjustable length pins; and
a lateral clamping mechanism that applies a lateral force to the plurality of pins during the machining operation, the lateral force configured to lock the plurality of pins at a height that corresponds to a bottom surface of the workpiece.

18. The fixturing device as recited in claim 17, further comprising a bulkhead disposed within the housing that separates the plurality of pins into a first region and a second region.

19. The fixturing device as recited in claim 18, wherein the at least one fixed length pin is disposed in each of the first and second regions.

20. The fixturing device as recited in claim 17, wherein the plurality of pins are characterized as having substantially similar geometry that facilitates generally lateral compression of the plurality of pins into a closed packed array when the lateral clamping mechanism applies the lateral force to the plurality of pins.

* * * * *